US011952963B2

(12) United States Patent
Cazuc et al.

(10) Patent No.: US 11,952,963 B2
(45) Date of Patent: Apr. 9, 2024

(54) THRUST REVERSER WITH ANTI-BUCKLING ACTUATING SYSTEM

(71) Applicant: Safran Nacelles, Gonfreville l'Orcher (FR)

(72) Inventors: Xavier Cazuc, Moissy Cramayel (FR); Vincent Dutot, Moissy Cramayel (FR); Sébastien Laurent Marie Pascal, Moissy Cramayel (FR); Stephane Riquier, Moissy Cramayel (FR); Patrick André Boileau, Moissy Cramayel (FR); Fabien Jourdan, Moissy Cramayel (FR)

(73) Assignee: Safran Nacelles, Gonfreville l'Orcher (FR)

(*) Notice: Subject to any disclaimer, the term of this patent is extended or adjusted under 35 U.S.C. 154(b) by 0 days.

(21) Appl. No.: 17/843,219

(22) Filed: Jun. 17, 2022

(65) Prior Publication Data

US 2022/0316427 A1    Oct. 6, 2022

Related U.S. Application Data

(63) Continuation of application No. PCT/FR2020/052468, filed on Dec. 16, 2020.

(30) Foreign Application Priority Data

Dec. 19, 2019 (FR) ...................................... 19/14901

(51) Int. Cl.
*F02K 1/76* (2006.01)
*F02K 1/72* (2006.01)

(52) U.S. Cl.
CPC ................ *F02K 1/763* (2013.01); *F02K 1/72* (2013.01)

(58) Field of Classification Search
CPC ...... F02K 1/54; F02K 1/56; F02K 1/64; F02K 1/70; F02K 1/72; F02K 1/76; F02K 1/763; F02K 1/766
See application file for complete search history.

(56) References Cited

U.S. PATENT DOCUMENTS 3,532,275 A    10/1970   Hom et al.
6,311,928 B1 *  11/2001  Presz, Jr. ................ F02K 1/763
                                                239/265.29

(Continued)

FOREIGN PATENT DOCUMENTS

EP    2628936 B1 *  5/2019  .............. F02K 1/64
FR    2907512       4/2008
FR    2978800       2/2013

OTHER PUBLICATIONS

International Search Report issued in corresponding International Application PCT/FR2020/052468, dated Apr. 1, 2021.

(Continued)

*Primary Examiner* — William H Rodriguez
(74) *Attorney, Agent, or Firm* — Burris Law, PLLC (57) ABSTRACT

A thrust reverser for a turbojet aircraft nacelle includes a fixed structure, a movable structure and an actuator. The actuator extends along a main axis and is connected by a first connection to the fixed structure and by a second connection to the movable structure for the deployment of the movable structure between a direct jet position and a reverse jet position. The actuator is also connected to the fixed structure by a third connection arranged longitudinally between the first connection and the second connection. An axis of the third connection is radially eccentric from the main axis and the third connection allows a predetermined displacement of the actuator with respect to the fixed structure.

15 Claims, 8 Drawing Sheets

(56) References Cited

U.S. PATENT DOCUMENTS

| | | | |
|---|---|---|---|
| 11,346,304 B2* | 5/2022 | Gormley | F02K 1/763 |
| 2010/0089029 A1 | 4/2010 | Somerfield et al. | |
| 2017/0226962 A1 | 8/2017 | Crawford | |
| 2017/0260928 A1* | 9/2017 | Crawford | F02K 1/625 |
| 2017/0363250 A1* | 12/2017 | Gormley | F16H 25/20 |
| 2018/0202390 A1* | 7/2018 | Kopecek | E05C 19/12 |
| 2019/0195170 A1* | 6/2019 | Patsouris | F02K 1/72 |
| 2019/0257269 A1* | 8/2019 | Rambaud | B64D 31/02 |
| 2020/0080514 A1* | 3/2020 | Gormley | F02K 1/763 |
| 2020/0102909 A1* | 4/2020 | Kopecek | E05B 47/0603 |
| 2021/0131380 A1* | 5/2021 | Gormley | F02K 1/763 |
| 2021/0310441 A1* | 10/2021 | Palanisamy | F02K 1/763 |
| 2022/0381200 A1* | 12/2022 | Gormley | F02K 3/04 |

OTHER PUBLICATIONS

Office Action issued in corresponding CN Application 202080088835.0, dated Dec. 13, 2023, and an English Translation, 26 pages.

\* cited by examiner

THRUST REVERSER WITH ANTI-BUCKLING ACTUATING SYSTEM

CROSS-REFERENCE TO RELATED APPLICATIONS

This application is a continuation of International Application No. PCT/FR2020/052468, filed on Dec. 16, 2020, which claims priority to and the benefit of FR 1914901 filed on Dec. 19, 2019. The disclosures of the above applications are incorporated herein by reference.

FIELD

The present disclosure relates to a turbojet engine nacelle comprising a thrust reverser configured to equip such a nacelle.

BACKGROUND

The statements in this section merely provide background information related to the present disclosure and may not constitute prior art.

A nacelle generally has a tubular structure comprising an air inlet upstream of the turbojet engine, a middle section intended to surround a fan of the turbojet engine, a downstream section accommodating thrust reversal means and intended to surround the combustion chamber of the turbojet engine and is generally terminated by an exhaust nozzle whose outlet is located downstream of the turbojet engine.

The modern nacelles are intended to accommodate a bypass turbojet engine capable of generating, via the rotating fan blades, a primary hot air flow from the combustion chamber of the turbojet engine, and a secondary cold air flow which circulates outside the turbojet engine through an annular passage, also called an air flow path, formed between a fairing of the turbojet engine and an internal wall of the nacelle. The two air flows are ejected from the turbojet engine of the nacelle rearwardly.

The role of a thrust reverser is, when an aircraft lands, to improve its braking capacity by redirecting at least part of the thrust generated by the turbojet engine forwards. In this phase, the thrust reverser obstructs the flow path of the cold flow and directs the latter towards the front of the nacelle, thereby generating a counter-thrust which is added to the braking of the wheels of the aircraft.

The means implemented to achieve this reorientation of the cold flow vary according to the type of the thrust reverser. However, in all cases, the structure of a reverser comprises a fixed structure and a movable structure that can be displaced between, on the one hand, a deployed position, called reverse jet position, in which it opens in the nacelle a passage intended for the deflected flow, and on the other hand, a retracted position, called direct jet position, in which it closes this passage. This movable structure can perform a deflection function or simply activate other deflection means.

The cascade-type thrust reversers are thus known in which the reorientation of the air flow is carried out by cascade vanes, the movable structure then consisting of a sliding movable cowl aiming at uncovering or covering these cascades, the translation of this movable cowl then activates the deployment of thrust reversal flaps allowing the closure of the flow path downstream of the cascades so as to optimize the reorientation of the cold flow. This displacement of the movable cowl is carried out by means of actuators along a longitudinal axis parallel to the axis of the nacelle. Each actuator is connected, on the one hand, to a fixed point of the fixed structure and, on the other hand, to a fixed point of the movable structure.

The movable cowl is subjected to forces in the longitudinal and radial directions taken up by the fixed structure via the actuators. During the displacement of the movable cowl towards its reverse jet position, each actuator is linearly elongated to accompany the displacement of the movable cowl. During the displacement of the actuator towards its reverse jet position and particularly at the end of its stroke, a blocking of the thrust reverser can occur at the level of the actuators or even at the level of the rails and slides between the fixed structure and the movable structure. Such a blocking of the thrust reverser results in a blocking of the linear elongation of the actuators. In this case, the energy applied to the reverser causes a bending moment which can deform radially, with respect to their axis, the actuators thus subjected to buckling.

Solutions consist in structurally reinforcing these actuators by increasing their section so that they can withstand a predetermined bending. These solutions unfortunately lead to an increase in mass of the thrust reverser.

The document FR 2 978 800 A1 discloses a nacelle comprising a thrust reverser as described previously and where the movable cowl is displaced in translation by means of linear actuators ensuring both the movement of the movable cowl and the deployment or the retracting of the thrust reversal flaps.

Unlike the aforementioned configurations of thrust reversers, each actuator also passes through an opening formed in a rear frame of the fixed structure.

If the opening of the rear frame of the fixed structure makes it possible to circumscribe the radial displacement of the actuator with respect to its axis, this prevents neither the degradation of the actuator, nor the propagation of mechanical vibrations, generated by the contact repeated between it and the fixed structure. In addition, this architecture requires sizing the rear frame structure to allow integration of the actuators.

The document FR 2907 512 A1 proposes to limit the phenomenon of bending of the actuator using a slide secured to the movable structure and accompanying the guide with a drive rod of the actuator with respect to a body of the actuator.

The use of such a "drive rod—slider" system imposes an integration into the cumbersome thrust reverser which also leads to an increase in the drag and the mass of the reverser. Moreover, such a system prevents complete retraction of the rod into the body of the actuator and therefore has the drawback of providing actuators of greater length, which has an impact on the axial dimension of the movable cowl. Moreover, such a system does not prevent the body of the actuators from being subjected to a buckling force by the reversal flow. It is therefore desired to increase the section of the structure of these actuators, which increases the mass of the assembly.

Other thrust reversers are known such as that of U.S. published application number 2017/226962 A1 for example and other actuating systems are known such as that of U.S. published application number 2010/089029 A1 for example.

SUMMARY

This section provides a general summary of the disclosure and is not a comprehensive disclosure of its full scope or all of its features.

The present disclosure provides a thrust reverser for a turbojet engine aircraft nacelle including a system for limiting the displacement of the actuators having a simplified integration while allowing a reduction in the drag and the mass of the reverser.

The present disclosure provides a thrust reverser for a turbojet engine aircraft nacelle comprising a fixed structure, a movable structure, and an actuator extending along a main axis and connected by a first connection to the fixed structure and by a second connection to the movable structure for the deployment of the movable structure between a direct jet position and a reverse jet position. The actuator being further connected to the fixed structure by a third connection arranged longitudinally between the first connection and the second connection. The third connection includes an axis that is radially eccentric from the main axis and the third connection allows a predetermined displacement of the actuator relative to the fixed structure.

The configuration of the thrust reverser according to the present disclosure makes it possible to limit the displacement of the actuator radially with respect to its axis so that the bending moment applied to the actuator about an axis perpendicular to its main axis is reduced. Indeed, the use of a third connection between the actuator and the fixed structure which is offset with respect to the main axis of the actuator allows the absorption by this connection of a large part of the forces transmitted from the movable structure to the fixed structure via the actuator. It is thus possible to reduce oversizing the structure of the actuators, and thus to avoid the increase in weight and the increase in cost of the actuators. Moreover, this solution makes it possible to standardize the use of a greater number of applications for the same actuator and therefore to promote the concept of product families.

Furthermore, the offset of the axis of the third connection relative to the axis of the actuator facilitates the integration of this third connection.

Moreover, the present disclosure allows facilitating the assembly and disassembly of the actuator, unlike the known prior art in which the actuator passes through an opening.

The main axis can be defined by a straight line connecting the first connection and the second connection.

It will be understood that the third connection forms a system for limiting the radial displacement of the actuator with respect to its main axis. The third connection allows a displacement of the actuator radially relative to the axis of the third connection.

The predetermined displacement advantageously corresponds to a radial displacement of the actuator with respect to the axis of the third connection over a maximum distance corresponding to 25% of the external diameter of the actuator.

It will be understood that the axis of the third connection is fixed with respect to the fixed structure.

According to another variation of the present disclosure, the third connection comprises complementary connection elements between the actuator and the fixed structure.

According to one variation, the complementary connection elements are configured to allow the predetermined displacement.

According to another variation, the complementary connection element of the fixed structure is carried by a deflection means (or deflection member) or a support structure for the deflection means. In this variation, the deflection means is fixed relative to the fixed structure, such as a fixed cascade vane.

In the case of fixed deflection means, a rear frame structure of the deflection means is used as support structure for the complementary connection element of the fixed structure.

According to one variation, the complementary connection element of the fixed structure is carried by an external structure of the fixed structure. In this variation, the deflection means is movable relative to the fixed structure, such as a movable cascade vane.

The external structure carrying the complementary connection element of the fixed structure can be a fan casing of the external structure. Alternatively, the external structure carrying the complementary connection element of the fixed structure can be a deflection edge of the external structure.

According to one variation of the present disclosure, the complementary connection elements comprise a pin and an opening, the pin being at least partly housed in the opening. The pin can be integrated or attached to the corresponding complementary element. The connection formed by the pin and the opening allows a limited mobility of the actuator relative to the fixed structure, thus allowing the predetermined displacement. In other words, the pin and the opening form between them a multidirectional radial stop limiting the radial displacement of the actuator with respect to its main axis. It is thus possible to resume the radial displacement with respect to the main axis regardless of the direction, thus limiting the deformation of the actuator. The pin can be oriented parallel to the main axis of the actuator. Advantageously, the pin can be oriented downstream or upstream of the reverser. The predetermined displacement then corresponds to a radial displacement of the actuator with respect to the axis of the third connection, the main axis being able to be displaced parallel or non-parallel with respect to the axis of the third connection.

In one variation, the complementary connection element of the fixed structure comprises the opening and the complementary connection element of the actuator comprises the pin. In this variation, the axis of the third connection passes through the center of the opening.

In another variation, the complementary connection element of the fixed structure comprises the pin and the complementary connection element of the actuator comprises the opening. In this variation, the axis of the third connection passes through the center of the pin.

According to one variation, a radial clearance is formed between the opening and the pin. The radial clearance between the opening and the pin then corresponds to the predetermined displacement.

According to another variation, the opening and the pin are press fitted. An elastic damper can be positioned between the opening and the pin. The elastic damper absorbs the mechanical stresses transmitted from the movable structure to the fixed structure. In the case of a press fit, the elastic properties of the damper allow a movement in the connection between the opening and the pin corresponding to the predetermined displacement.

In yet another variation of the present disclosure, the axis of the opening and the axis of the pin are eccentric with respect to each other. The eccentric axes of the opening and of the pin advantageously make it possible to inhibit the predetermined displacement in a given direction.

According to one variation of the present disclosure, the actuator comprises a body and a rod, the rod being guided by the body, the complementary connection element of the actuator being carried by the body of the actuator. The external diameter of the actuator is determined by the cylinder body. Advantageously, the complementary connection element of the actuator is carried at the end of the body of the actuator from which the rod extends.

According to another variation of the present disclosure, the complementary connection elements of the fixed structure and of the actuator respectively comprise a flat surface spaced apart from each other by an axial clearance. The axial clearance makes it possible to inhibit the transmission of the axial forces transmitted from the movable structure to the fixed structure via the third connection of the actuator.

According to yet another variation, the flat surfaces of the fixed structure and of the actuator comprise the opening and the pin.

According to one variation of the present disclosure, the flat surface of the complementary connection element of the actuator is formed by a projection from the body of the actuator.

According to another variation of the present disclosure, the flat surface of the complementary connection element of the fixed structure is formed by a radial wall. The projection and the radial wall together carry the opening and the pin.

According to yet another variation of the present disclosure, the flat surface of the complementary connection element of the actuator is formed by two projections extending from the body of the actuator and the flat surface of the complementary connection element of the fixed structure is formed by two protrusions in correspondence of said projections.

Advantageously, each projection and its complementary protrusion carry an opening and a pin.

Advantageously, the two protrusions of said radial wall delimit between them a rounded shape hollow. The hollow rounded shape allows the integration at least in part of the actuator with the complementary connection element of the fixed structure. Such integration allows a reduction in the size of the thrust reverser, thus reducing the drag and the mass of the reverser.

The complementary connection element of the fixed structure can advantageously be integrated into the fixed structure.

Advantageously, the complementary connection element of the fixed structure is formed by an angle iron.

The present disclosure also relates to an aircraft nacelle comprising such a thrust reverser.

The term "radial" will be understood as a radial direction with respect to a longitudinal axis of the nacelle.

The term "axial" will be understood as an axial direction in the longitudinal direction of the nacelle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5b is a perspective view of a downstream portion of the alternate actuator of FIG. 5a;

FIG. 5c is a front view of the downstream portion of the alternate actuator of FIG. 5a;

FIG. 5d is an enlarged perspective view of a portion of the alternate actuator of FIG. 5a;

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In all of the figures, identical or similar references designate identical or similar members or sets of members.

The expression "upstream" and "front" will be used interchangeably to designate the upstream of the thrust reverser and the expression "downstream" and "rear" will be used interchangeably to designate the downstream of the thrust reverser.

The expressions "upstream" and "downstream" refer to the direction of airflow entering and exiting a nacelle.

In general, a nacelle is configured to constitute a tubular housing for a bypass turbojet engine and is used to channel the airflows that it generates via the blades of a fan, namely a flow of hot air (called main flow path) passing through a combustion chamber and a cold air flow path (called secondary flow path) circulating outside the turbojet engine.

Figure 1:
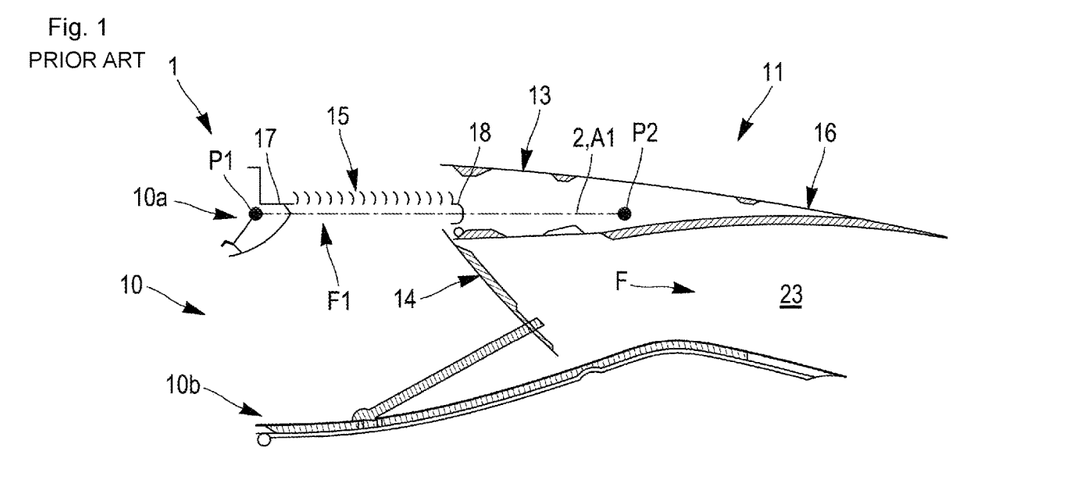
FIG. 1 is a schematic sectional view of a prior art reverser.

The nacelle comprises an upstream section forming an air inlet, a middle section surrounding the fan of the turbojet engine and a downstream section 1 extending the middle section and surrounding the turbojet engine. There is shown in FIG. 1, the part of the downstream section 1 of a nacelle known from the prior art.

The downstream section 1 comprises a nacelle thrust reverser, represented here in a reverse jet configuration. The downstream section 1 comprises a fixed structure 10 and a movable structure 11.

The movable structure 11 comprises a movable cowl 13 and reversal flaps 14. Flow deflection means 15 have been represented, consisting of an assembly of cascade vanes fixed relative to the fixed structure 10. The movable structure 11 terminates in an exhaust nozzle section 16.

The fixed structure 10 includes an external structure 10a and an internal structure 10b of the engine fairing defining with the external structure 10a and the movable cowl a flow path 23 for the circulation of the flow of cold air or secondary flow, illustrated by the arrow F, in the case of the turbojet engine nacelle as presented here. The external structure 10a further comprises a front frame structure 17 and a rear frame or rear frame structure 18 providing support for the deflection means 15 to the fixed structure 10 of the thrust reverser. The front frame structure 17 and the rear frame structure 18 are each attached to the external structure 10a of the fixed structure 10.

The movable cowl 13 is configured to be actuated in a longitudinal direction of the nacelle between two extreme positions, namely a closed position, called the direct jet position, in which the movable cowl 13 comes into contact with the external structure 10a and where the inversion flaps 14 are retracted to provide the aerodynamic continuity of the external lines of the downstream section 1 allowing the circulation of the secondary flow F in the flow path 23, and an open position represented in FIG. 1, called reverse jet position, in which it opens a passage in the nacelle, obstructs the flow path 23 using the deployed inversion flap 14 and uncovers the deflection means 15.

The reverse jet position of the movable cowl allows the secondary flow F of the turbojet engine to escape at least partially, this portion of flow called diverted flow, illustrated by the arrow F1 being redirected towards the front of the nacelle by the cascade vanes, thereby generating a counter-thrust capable of assisting the braking of the aircraft.

The deployment of the movable structure 11 is carried out by a set of actuators 2 represented here schematically by the main axis A1 of the actuator 2 actuating the longitudinal displacement of the movable structure 11 guided with respect to the fixed structure 10 by the intermediary of a rail/slide system (not shown). The actuator 2 thus provides the management of the thrust reversal by controlling the movable structure 11 comprising the movable cowl 13.

Each actuator 2 is connected, on the one hand, by a first connection P1 fixed to the fixed structure 10, here the front frame structure 17 and, on the other hand, by a second connection P2 fixed to the movable structure 11.

In the configuration represented in FIG. 1, the actuator 2 passes through an opening formed in the rear frame structure 18.

Figure 2A:
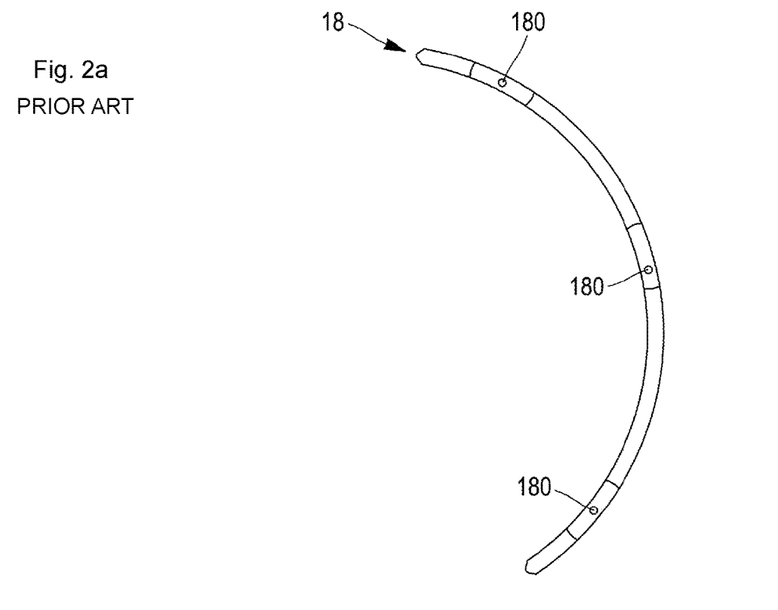
FIG. 2a is a schematic view of part of a rear frame structure of the reverser of FIG. 1.
Figure 2B:
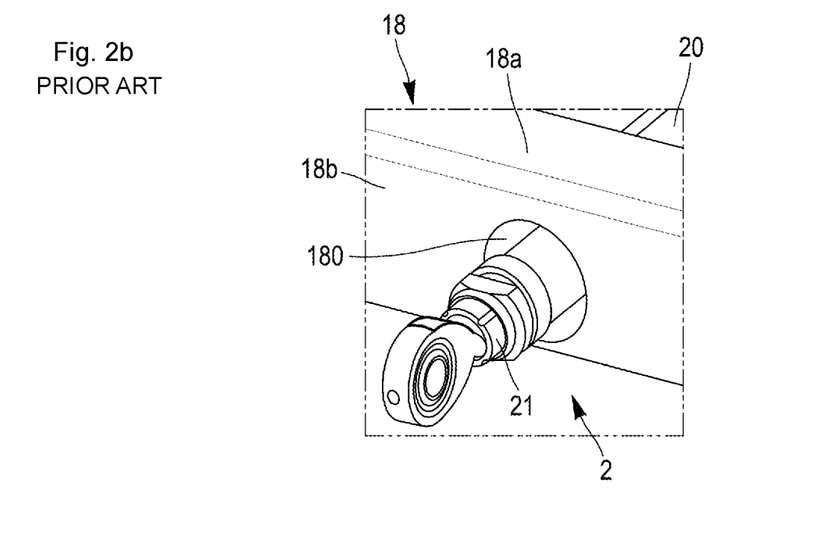
FIG. 2b is a perspective view of the rear frame structure of FIG. 2a equipped with an actuator.

This configuration is illustrated in more detail in FIGS. 2a and 2b.

FIG. 2a partially shows the rear frame structure 18 taking the form of a circular ring in which are formed openings 180 through which the actuators 2 pass through the rear frame structure 18.

FIG. 2b illustrates in more detail the rear frame structure 18 comprising an axial wall 18a, as well as a radial wall 18b joined together. The openings 180 are formed on the radial wall 18b of the rear frame structure 18.

FIG. 2b also illustrates the mounting of an actuator 2 through such an opening 180 of the rear frame structure 18. The actuator 2 comprises a hollow body 20 inside which is housed a movable in translation rod 21. The hollow body 20 is attached at its upstream end to the front frame structure 17 by the first connection P1, while the rod 21 is connected at its free downstream end to the movable structure 11 by the second connection P2. The rod 21 thus crosses the rear frame structure 18, to be fixed to the movable structure 11.

If this solution makes it possible to limit the movement of the actuator 2, it has the disadvantage of a complex integration with the fixed structure 10, more particularly with its rear frame structure 18. In a configuration of particularly fine aerodynamic lines, this rear frame solution is not feasible, given its size.

Figure 3:
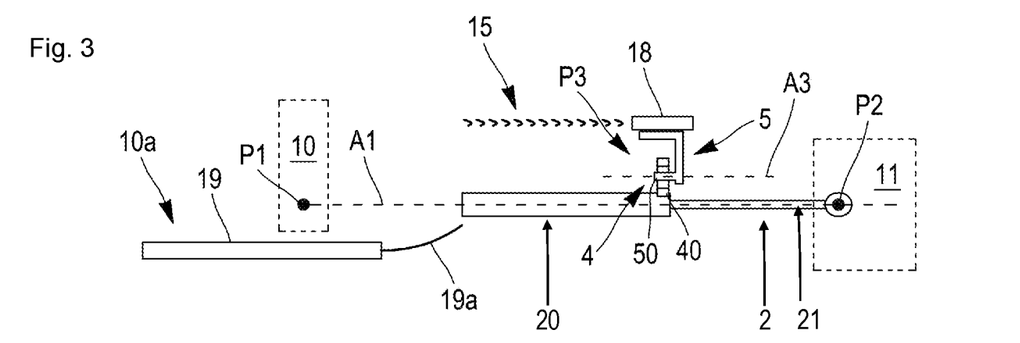
FIG. 3 is a schematic view of an actuator applied to a thrust reverser comprising fixed deflection means in accordance with the principles of the present disclosure.
Figure 4:
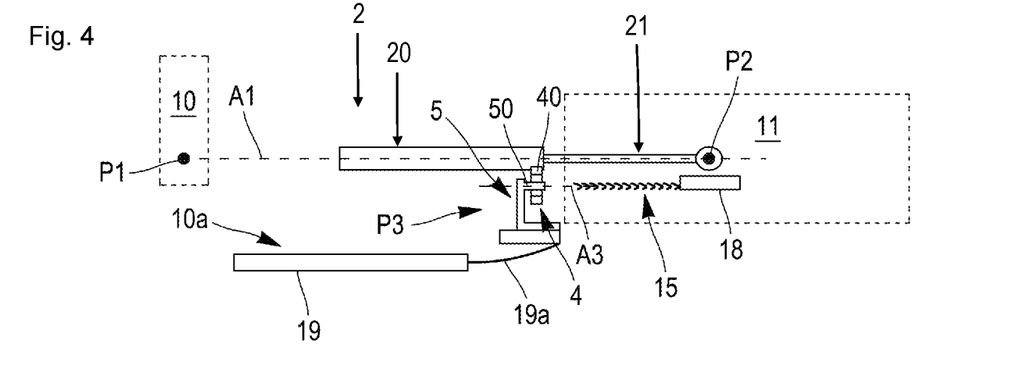
FIG. 4 is a schematic view of an actuator applied to a thrust reverser comprising movable deflection means in accordance with the principles of the present disclosure.

The present disclosure illustrated by FIGS. 3 and 4, makes it possible, among other things, to simplify the integration of the actuator 2 into the fixed structure 10 while limiting the risks of the actuator 2 moving.

FIG. 3 illustrates an implementation of the present disclosure applied to a thrust reverser whose deflection means are fixed, such as fixed cascade vanes. The illustration of the form of FIG. 3 has been simplified to better represent the present disclosure. In this case, the external fixed structure 10a has been partially shown comprising a fan casing 19 terminating in a deflection edge 19a and the rear frame structure 18. The body 20 of the actuator 2 is connected to the fixed structure 10 by the first connection P1 while the rod 21 is connected to the movable structure 11 by the second connection P2. The actuator 2 extends along the main axis A1 which is coaxial with the hollow body 20 and the rod 21.

In addition to the first connection P1 and the second connection P2, a third connection P3 is provided between the actuator 2 and the fixed structure 10. This third connection P3 is arranged longitudinally between the first connection P1 and the second connection P2.

As represented, the axis A3 of the third connection P3 is eccentric radially with respect to the main axis A1. The axis A3 of the third connection P3 is chosen as a fixed axis with respect to the fixed structure 10.

The third connection P3 is provided to allow a predetermined displacement, in a radial direction relative to the axis A3, of the actuator 2 relative to the fixed structure 10. This predetermined displacement makes it possible to restrict the amplitude of movement of the actuator 2 when the latter is subjected to moving.

Thus, the third connection P3 is provided to allow the main axis A1 of the actuator 2 and the actuator 2 to be radially displaced with respect to the axis of the third connection A3.

As illustrated, the third connection P3 comprises complementary connection elements 4, 5 between the actuator 2 and the fixed structure 10 to provide the predetermined displacement.

The complementary connection elements 4, 5 comprise an opening 40 and a pin 50, the pin 50 being at least partly housed in the opening 40. The connection formed by the pin 50 and the opening 40 allows circumscribed mobility of the actuator 2 with respect to the fixed structure 10 thus allowing the predetermined displacement. In other words, the displacement of the actuator 2 is circumscribed radially with respect to the axis of the third connection P3.

In the case illustrated in FIG. 3, the complementary connection element 4 of the fixed structure 10 is carried by a support structure, here the rear frame structure 18, of the fixed deflection means 15 and the complementary connection element 5 of the actuator 2 is carried by the body 20 of the actuator 2.

The complementary connection element 4 of the fixed structure 10 is formed by an angle iron from which the pin 50 extends and the complementary connection element 5 of the actuator 2 is formed by a projection of the body 20 including the opening 40.

FIG. 4 illustrates an implementation of the present disclosure applied to a thrust reverser whose deflection means are movable, such as movable cascade vanes. The illustration of the form of FIG. 4 has also been simplified to better represent the present disclosure.

In this case of application of FIG. 4, the deflection means 15 are cascade vanes movable relative to the fixed structure 10. The cascade vanes are carried by the movable structure 11. The rear frame structure 18 is then fixed with respect to the movable structure 11 and can entirely carry the deflection means 15.

The complementary connection elements 4, 5 represented in FIG. 4 are the same as those in FIG. 3.

Unlike the case illustrated in FIG. 3, in the case illustrated in FIG. 4, the complementary connection element 4 of the fixed structure 10 is carried by the external structure 10a, here the deflection edge 19a of the fixed structure 10 or alternatively the fan casing 19.

In the remainder of the description, the third connection P3 applied to the case of a thrust reverser with fixed cascades such as that illustrated in FIG. 3 will be described in more detail.

The characteristics described below are also applied to a thrust reverser with movable cascades.

Figure 5A:
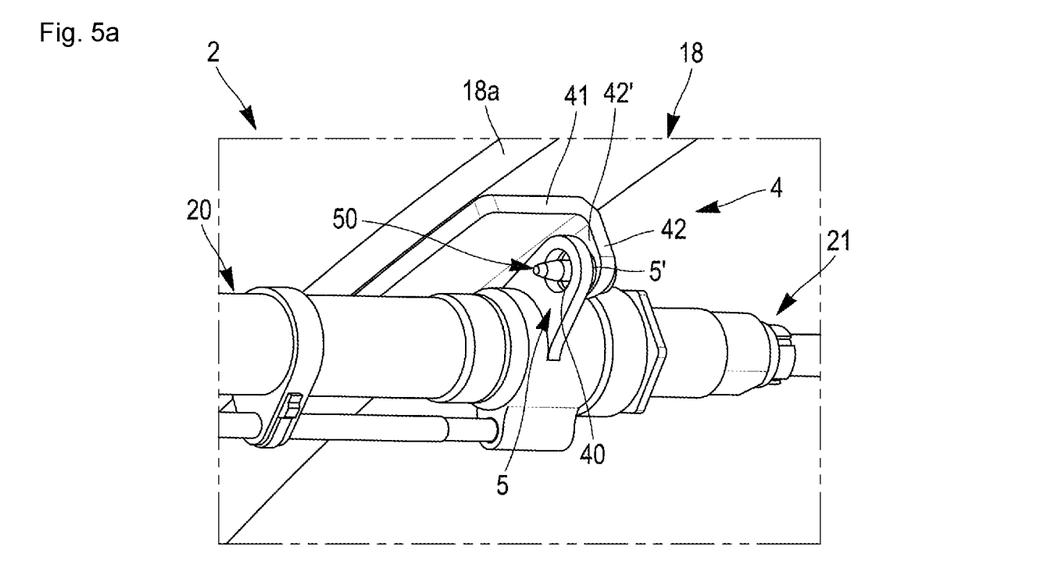
FIG. 5a is a perspective view of an upstream portion of an alternate actuator in accordance with the principles of the present disclosure.

In FIG. 5a, there is illustrated in detail an upstream view of a form similar to that of the form represented in FIG. 3. Unlike the form of FIG. 3, the complementary connection element 4 of the fixed structure 10 includes the pin 50 and the complementary connection element 5 of the actuator 2 includes the opening 40.

The complementary connection element 4 of the fixed structure 10 or angle iron comprises an axial wall 41 extended by a radial wall 42. The axial wall 41 is fixedly mounted on the rear frame structure 18, for example by welding.

The complementary connection element of the actuator 2 or projection takes the form of a lug.

Figure 5B:
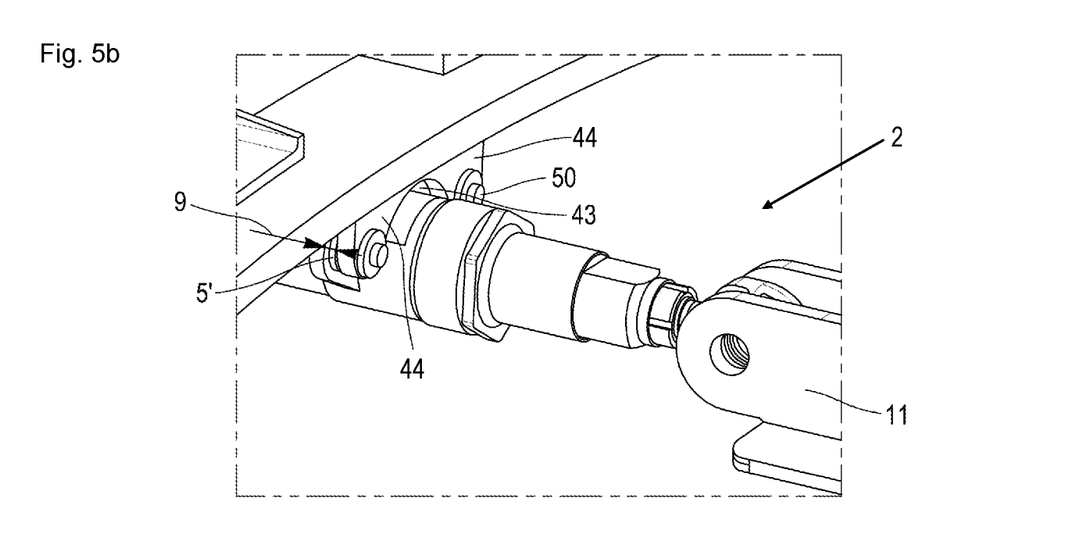

The radial wall 42 and the lug respectively comprise a flat surface 42', 5' spaced apart from each other by an axial clearance 9 (FIG. 5b). Such an axial clearance makes it possible to avoid the transmission of axial forces from the movable structure 11 to the fixed structure 10 via the third connection P3 of the actuator 2. These same flat surfaces 42', 5' carry the opening 40 and the pin 50. More particularly, the flat surface 42' of the complementary connection element 4 of the fixed structure 10 carries the pin 50 and the flat surface 5' of the complementary connection element 5 of the actuator 2 carries the opening 40.

Figure 5C:
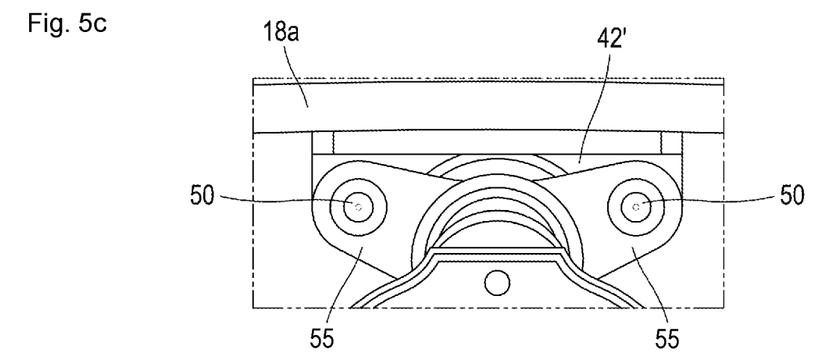

FIGS. 5b and 5c show different views of the form of FIG. 5a. FIG. 5b also shows the second fixed connection P2 between the rod 21 of the actuator 2 and the movable structure 11.

FIGS. 5b and 5c together illustrate that the flat surface 5' of the complementary connection element 5 of the actuator 2 comprises two projections 55 in the form of lugs extending from the body 20 of the actuator 2. These projections 55 can be spaced apart from each other by an angle of less than 180°. The flat surface 42' of the complementary connection element 4 of the fixed structure 10 is formed by two protrusions 44 in correspondence of said projections 55. The two protrusions 44 of the radial wall 42 delimit between them a hollow rounded shape 43 which allows the simplified integration at least in part of the actuator 2 with the complementary connection element of the fixed structure. Such integration allows a reduction in the size of the thrust reverser, thus reducing the drag and the mass of the reverser. Similarly to the above, each projection 55 and its complementary protrusion 44 carry an opening 40 and a pin 50.

Figure 5D:
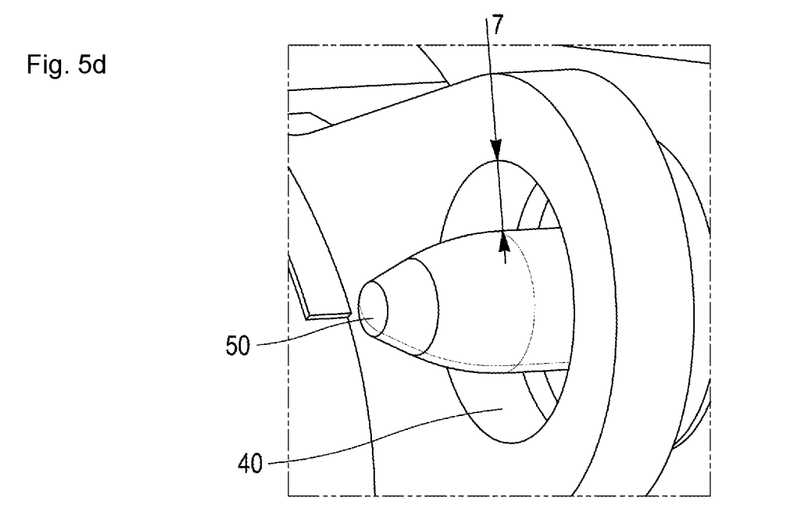

FIG. 5d illustrates an enlargement of the third connection P3 represented in FIG. 5a where a radial clearance 7 has been shown formed between the opening 40 and the pin 50. The clearance between the opening 40 and the pin 50 then corresponds to the predetermined displacement.

Figure 6:
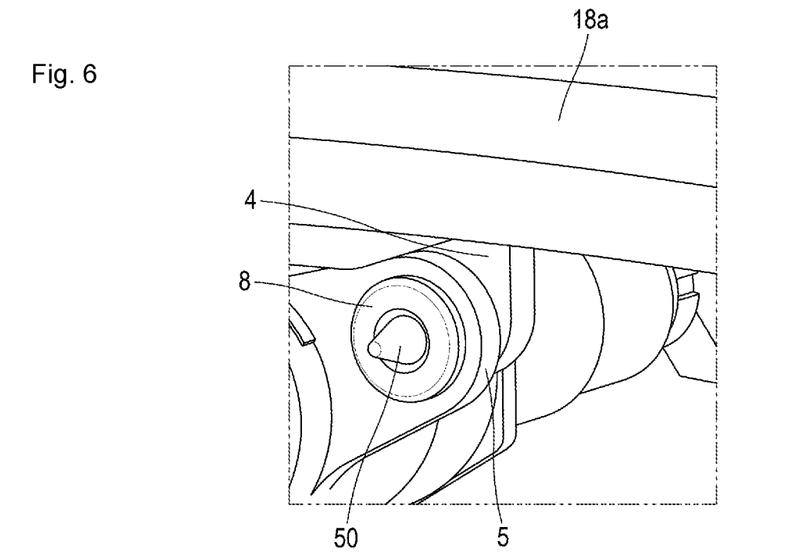
FIG. 6 is a perspective view of connection elements secured to each other.

In a variant illustrated in FIG. 6, the opening 40 and the pin 50 are press fitted.

In all cases, there may be provided an elastic damper 8 provided between the opening 40 and the pin 50 to allow the absorption of the mechanical stresses transmitted from the movable structure 11 to the fixed structure 10. The damper is here formed by an elastic ring housed in the opening 40 and surrounding the pin 50.

The elastic damper 8 can be attached to or integrated into the opening 40 or the pin 50. The damper 8 can be provided to provide the press fit between the opening 40 and the pin 50.

FIGS. 7a to 7d illustrate different arrangements of the third connection P3 of the present disclosure applied to a fixed deflection means 15.

Figure 7A:
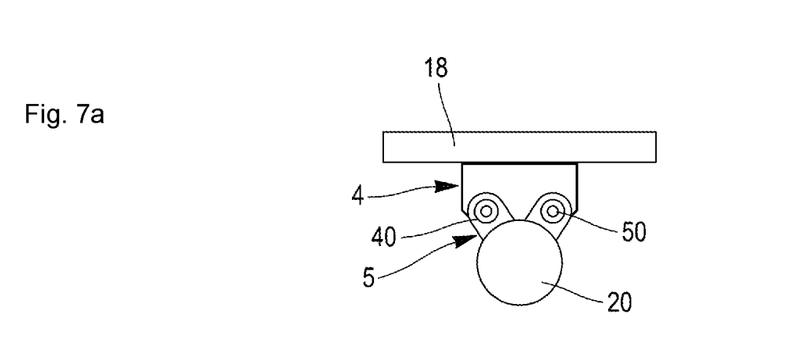
FIGS. 7a-7d are schematic views of various arrangements of the third connection applied to a fixed deflection means.

In FIG. 7a, there are shown two projections 5 in the form of lugs extending from the body 20 of the actuator 2 and each comprising an opening 40 receiving a pin 50 extending from an angle iron 4 secured to the rear frame 18. This configuration advantageously makes it possible to limit the circumferential displacement of the actuator 2 with respect to the axis of the third connection A3 and to provide better absorption of the forces in the case of movement of the actuator 2.

Figure 7B:
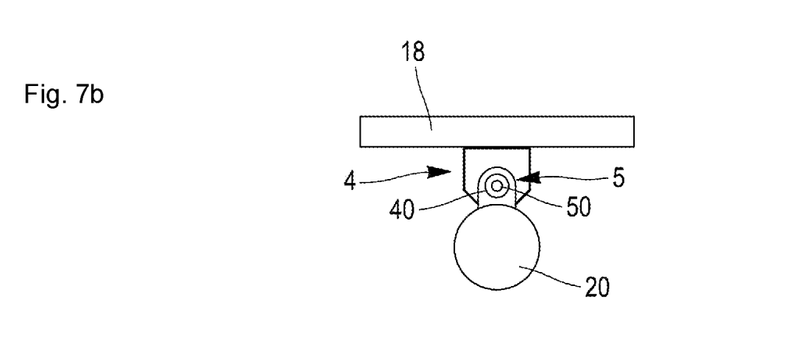

In FIG. 7b, there is represented a single projection 5 in the form of a lug extending from the body 20 of the actuator 2 and comprising an opening 40 receiving a pin 50 projecting from an angle iron 4 secured to the rear frame 18. This configuration advantageously makes it possible to reduce the mass of the elements forming the third connection P3 and to facilitate the assembly and disassembly of the actuator 2.

Figure 7C:
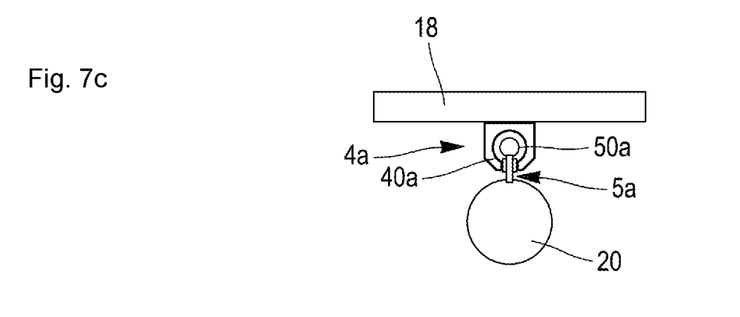

In FIG. 7c, the opening 40a is formed on the angle iron 4a secured to the rear frame 18 and the pin 50a extends from a linear projection 5a secured to the body 20 of the actuator 2.

Figure 7D:
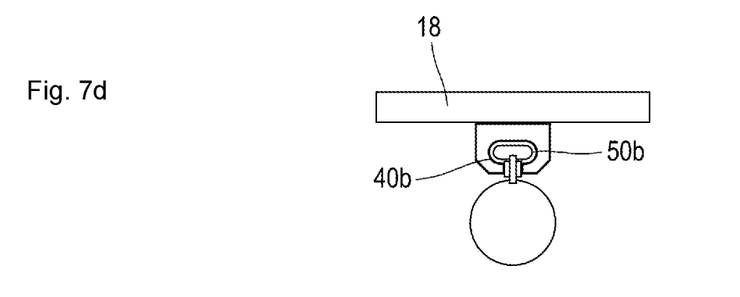

In the previously illustrated forms applied to a fixed deflection means 15, the opening 40 and the pin 50 are of complementary circular shape. In FIG. 7d, unlike the configurations illustrated previously, the opening 40b and the pin 50b are of complementary oblong shape. Such an oblong shape allows better absorption of forces in the case of movement of the actuator 2.

FIGS. 8a to 8d illustrate different arrangements of the third connection P3 of the present disclosure applied to a movable deflection means 15.

Figure 8A:
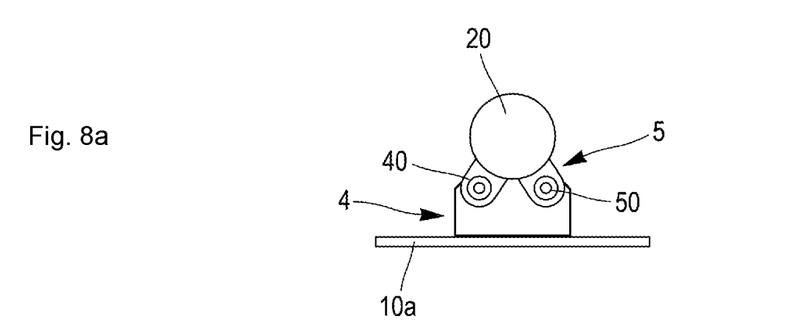
FIGS. 8a-8d are schematic views of various arrangements of the third connection applied to a moveable deflection means.

In FIG. 8a, there are represented two projections 5 in the form of lugs extending from the body 20 of the actuator 2 and each comprising an opening 40 receiving a pin 50 extending from an angle 4 secured to the external structure 10a, for example the deflection edge 19a of the fixed structure 10 or alternatively the fan casing 19. This configuration also makes it possible to limit the circumferential displacement of the actuator 2 with respect to the axis of the third connection A3 and to provide better recovery of forces in the case of movement of the actuator 2.

Figure 8B:
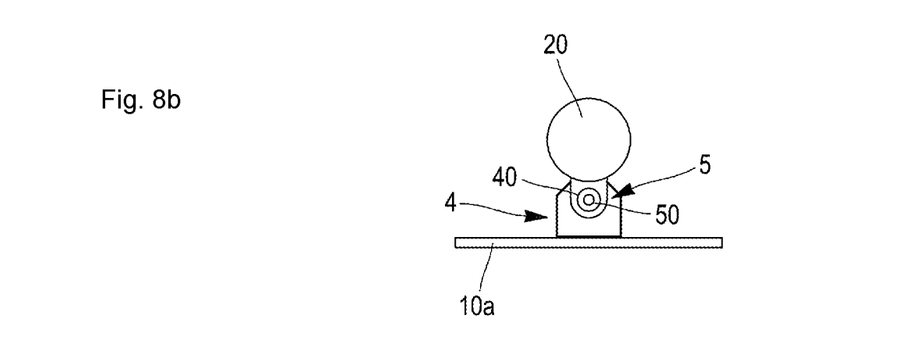

In FIG. 8b, there is represented a single projection 5 in the form of a lug extending from the body 20 of the actuator 2 and comprising an opening 40 receiving a pin 50 projecting from an angle iron 4 secured to the external structure 10a. This configuration also makes it possible to reduce the mass of the elements forming the third connection P3 and to facilitate the assembly and disassembly of the actuator 2.

Figure 8C:
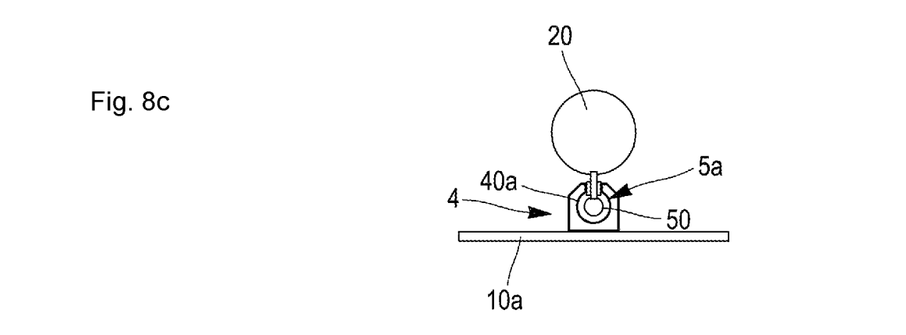

In FIG. 8c, the opening 40a is formed on the angle iron 4a secured to the external structure 10a and the pin 50a extends from a linear projection 5a secured to the body 20 of the actuator 2.

In the previously illustrated forms applied to a movable deflection means 15, the opening 40 and the pin 50 are of complementary circular shape.

Figure 8D:
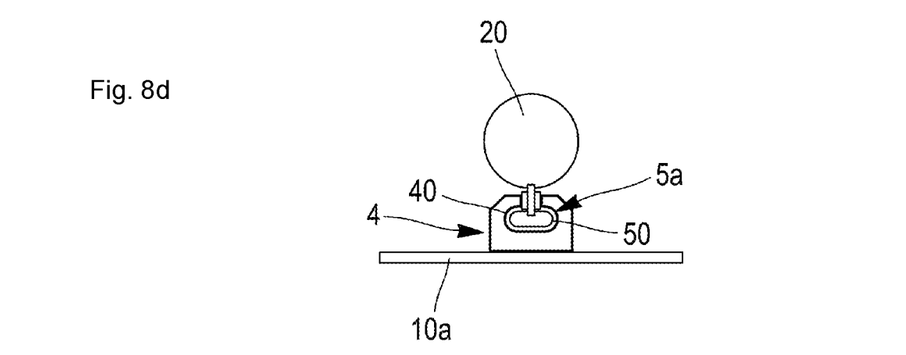

In FIG. 8d, unlike the configurations illustrated previously, the opening 40b and the pin 50b are of complementary oblong shape. Such an oblong shape allows better absorption of forces in the case of movement of the actuator 2.

Of course, in the different forms described previously, the arrangement of the opening and of the pin of the third connection can be reversed.

Figure 9:
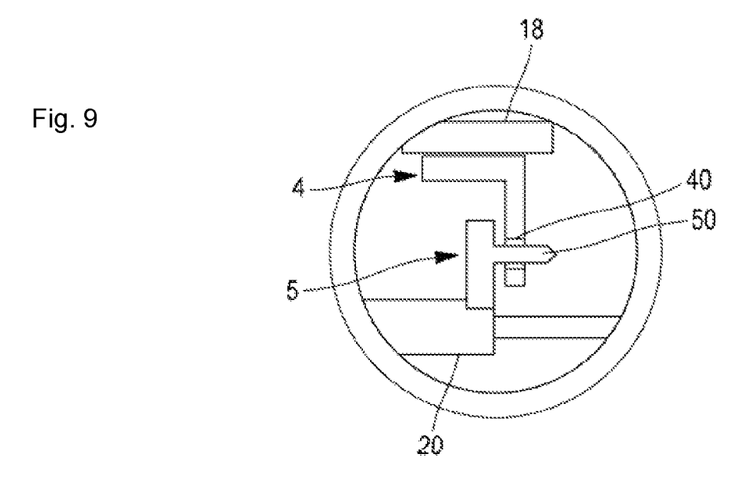
FIG. 9 is a schematic view of an actuator secured to a structure.

By way of example, there is represented in FIG. 9 a variant illustrated in FIG. 3 where the complementary connection element 5 of the actuator 2 comprises the pin 50 and the complementary connection element 4 of the fixed structure 10, here its rear frame 18, comprises the opening 40.

Figure 10:
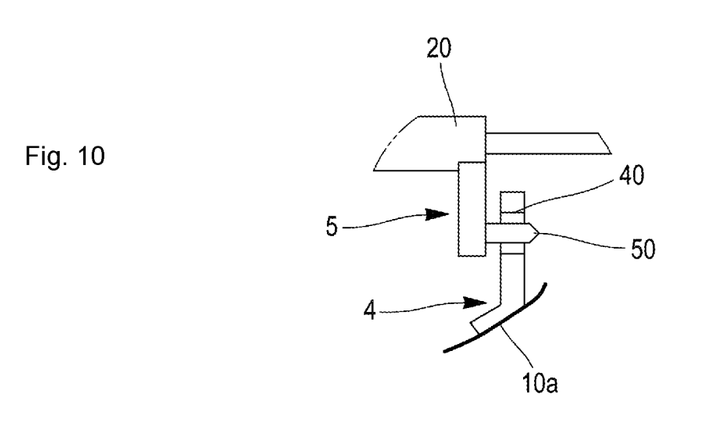
FIG. 10 is another schematic view of an actuator secured to a structure.

In another example, there is represented in FIG. 10, a variant illustrated in FIG. 4 where the complementary connection element 5 of the actuator 2 comprises the pin 50 and the complementary connection element 4 of the fixed structure 10, here the external structure 10a, for example the deflection edge 19a of the fixed structure 10, comprises the opening 40.

Of course, the example of implementation mentioned above is in no way limiting and other improvements and details can be made to the nacelle according to the present disclosure, without however departing from the scope of the present disclosure where other forms of deflection means can for example be made.

Provision may be made for the actuator 2 to be a simple linear actuator electrically, hydraulically or pneumatically actuated. Or that this actuator 2 can be attached to the fixed structure 10 between two longitudinal attachment lines of deflection means 15.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thrust reverser for a turbojet aircraft nacelle comprising:
    a fixed structure;
    a movable structure; and
    an actuator extending along a main axis and connected by a first connection to the fixed structure and by a second connection to the movable structure for the deployment of the movable structure between a direct jet position and a reverse jet position,
    wherein the actuator being further connected to the fixed structure by a third connection arranged longitudinally between the first connection and the second connection, and
    wherein an axis of the third connection is radially eccentric from the main axis and the third connection allows a predetermined displacement of the actuator with respect to the fixed structure.

2. The thrust reverser according to claim 1, wherein the third connection comprises complementary connection elements between the actuator and the fixed structure.

3. The thrust reverser according to claim 2, wherein the complementary connection elements comprise a pin and an opening, the pin being at least partly housed in the opening.

4. The thrust reverser according to claim 3, wherein a radial clearance is formed between the opening and the pin.

5. The thrust reverser according to claim 3, wherein the opening and the pin are press fitted.

6. The thrust reverser according to claim 3, further comprising an elastic damper positioned between the opening and the pin.

7. The thrust reverser according to claim 3, wherein the pin is oriented parallel to the main axis of the actuator.

8. The thrust reverser according to claim 2, wherein one complementary connection element of the complementary connection elements is carried by a deflection member or a support structure of the deflection member.

9. The thrust reverser according to claim 2, wherein one complementary connection element of the complementary connection elements is carried by an external structure of the fixed structure.

10. The thrust reverser according to claim 2, wherein the actuator comprises a body and a rod, the rod being guided by the body, and wherein one complementary connection element of the complementary connection elements is carried by the body of the actuator.

11. The thrust reverser according to claim 2, wherein a first complementary connection element of the complementary connection elements comprises a first flat surface and a second complementary connection element of the complementary connection elements comprises a second flat surface, and wherein the first flat surface and the second flat surface are spaced apart from each other by an axial clearance.

12. The thrust reverser according to claim 11, wherein the second flat surface of the second complementary connection element is formed by a projection of a body of the actuator.

13. The thrust reverser according to claim 11, wherein the second flat surface of the second complementary connection element is formed by two projections extending from a body of the actuator and the first flat surface of the first complementary connection element is formed by two protrusions in correspondence of the two projections.

14. The thrust reverser according to claim 11, wherein the first flat surface of the first complementary connection element is formed by a radial wall.

15. A nacelle for aircraft comprising a thrust reverser according to claim 1.

* * * * *